United States Patent
Hwang Bo et al.

(10) Patent No.: US 6,392,384 B1
(45) Date of Patent: May 21, 2002

(54) STORAGE BATTERY CHARGER AND METHOD FOR CONTROLLING THE CHARGING PROCESS

(75) Inventors: Sang-Moo Hwang Bo, Taegu-Kwangyokshi; Chang-Sik Park, Kyonggi-do; Dong-Wook Gwak, Kyongsangbuk-do, all of (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/556,540

(22) Filed: Apr. 24, 2000

(30) Foreign Application Priority Data

Apr. 23, 1999 (KR) ........................................ 1999-14674

(51) Int. Cl.7 ................................................ H02J 7/00
(52) U.S. Cl. ...................................... 320/116; 320/160
(58) Field of Search ................................ 320/116, 137, 320/138, 134, 160, 124

(56) References Cited

U.S. PATENT DOCUMENTS 5,355,071 A  * 10/1994 Ishida et al. ................. 320/110
5,640,078 A     6/1997 Kou et al. .................... 320/124

FOREIGN PATENT DOCUMENTS

| JP | 0807998  | 3/1996  |
|----|----------|---------|
| JP | 09182308 | 7/1997  |
| JP | 09285033 | 10/1997 |

* cited by examiner

Primary Examiner—Peter S. Wong
Assistant Examiner—Lawrence Luk
(74) Attorney, Agent, or Firm—Dilworth & Barrese, LLP (57) ABSTRACT

A battery charger for charging at least two storage batteries, comprises: a first charging pocket for receiving a first storage battery; a second charging pocket for receiving a second storage battery; a main controller for generating a power supply control signal, charging voltage setting control signal according to the voltage types of the batteries inserted in the first and second charging pockets, and charging current setting control signal according to the current capacities of the batteries; a voltage adjustment circuit for adjusting the charging voltage to the levels respectively fit for the voltage types of the batteries according to the charging voltage setting control signal; a current adjustment circuit for adjusting the charging current to the levels respectively fit for the current capacities of the batteries according to the charging current setting control signal; and a power supply control circuit for supplying or blocking the charging voltages to the batteries according to the power supply control signal.

22 Claims, 12 Drawing Sheets

STORAGE BATTERY CHARGER AND METHOD FOR CONTROLLING THE CHARGING PROCESS

BACKGROUND OF THE INVENTION

1. Field of the Invention

The present invention relates to a battery charger for simultaneously charging multiple storage batteries, and more particularly to an apparatus and method for simultaneously charging the multiple storage batteries loaded in the multiple charging pockets of the apparatus by controlling the charging voltage and current according to the voltage types and current capacities of the batteries.

2. Description of the Related Art

Figure 1A:
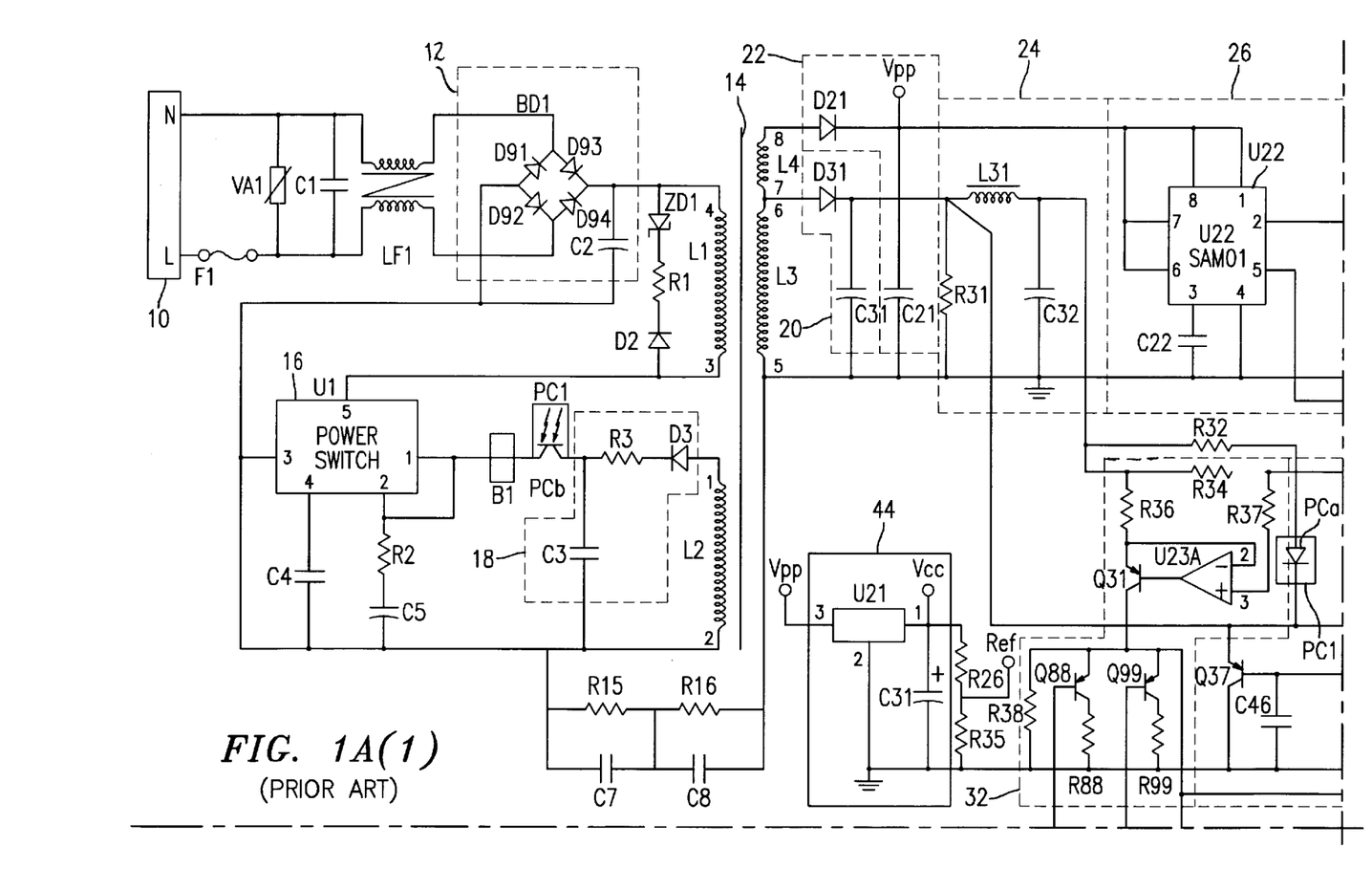
FIGS. 1A and 1B are a circuit diagram for illustrating the structure of a conventional battery charger.
Figure 1B:
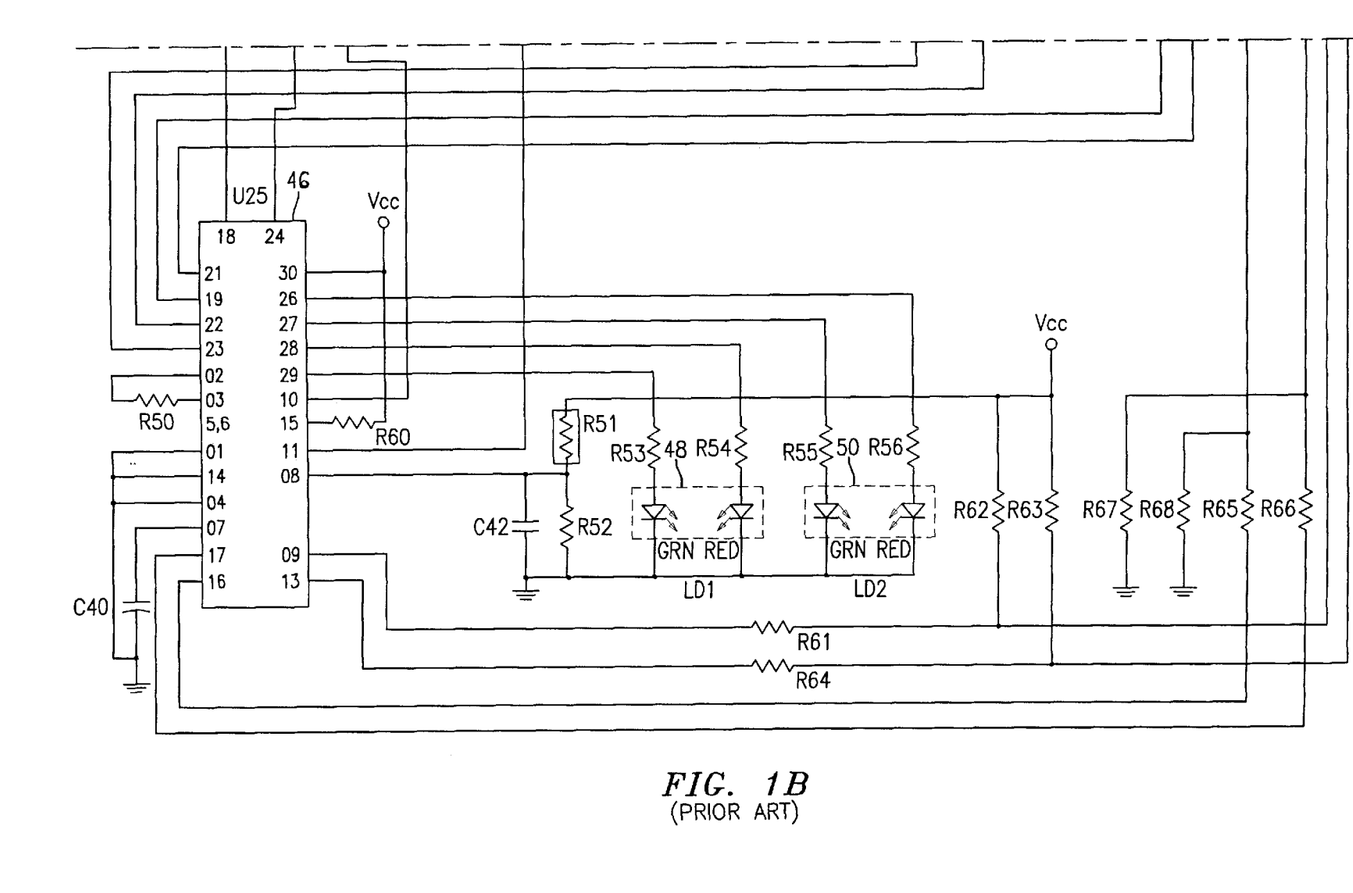

The conventional battery charger for charging the storage batteries such as a Li-Ion battery used in a mobile phone must be provided with multiple DC power sources in order to simultaneously charge multiple batteries. Referring to FIG. 1, the conventional battery charger includes an input terminal 10 for connecting with a power source of AC 110V to 220V, and a full-wave rectifier 12 consisting of bridge diodes D91–D94 and a capacitor C2 for full-wave rectifying the AC power from the input terminal 10 to produce a smoothed DC voltage. A Zener diode ZD1, resistor R1 and diode D2 serve to block a higher voltage exceeding a prescribed voltage. The DC voltage from the full-wave rectifier 12 causes a primary coil L1 of a transformer 14 to induce a secondary voltage in secondary coils L2, L3 and L4. A power switch 16 is switched on/off to control the level of the secondary voltage induced in the secondary coils L2, L3 and L4 according to a switching control signal.

The secondary voltage induced in the secondary coil L2 is rectified by a first rectifying circuit 18 consisting of a resistor R3, diode D3 and capacitor C3 to stabilize the DC voltage supplied to the power switch 16. The secondary voltage induced in the secondary coil L3 is rectified by a second rectifying circuit 20 consisting of a diode D31 and capacitor C31. The rectified voltage from the second rectifying circuit 20 is smoothed by a smoothing circuit 24 consisting of a choke coil L31, capacitor C32 and resistor R31, charging the storage batteries. The secondary voltage induced in the secondary coil L4 is rectified by a third rectifying circuit 22 consisting of a diode D21 and capacitor C21, supplied to a chopper circuit 26, which consists of a first regulator U22, capacitor C22, coil L21 and diode D22, to adjust the rectified voltage of the third rectifying circuit 22 to a prescribed level.

A first charging voltage control circuit 40 consists of resistors R30, R71, capacitor C26, transistor Q24, and field effect transistor FET Q23 to supply or block the charging voltage to a first battery loaded in a pocket 'A' according to a charging on/off control signal generated by a microprocessor 46. A second charging voltage control circuit 42 consists of resistors R44, R72, capacitor C35, transistor Q34, and field effect transistor FET Q25 to supply or block the charging voltage to a second battery loaded in a pocket 'B' according to a charging on/off control signal generated by the microprocessor 46.

A first charging voltage selection circuit 36 consists of resistors R27, R28, R29, variable resistor VR1, diode D23, capacitor C50, and transistor Q22, to set a first charging voltage fit for the voltage type of the battery loaded in the pocket 'A' according to a charging voltage selection control signal generated by the microprocessor 46. A second charging voltage selection circuit 38 consists of resistors R41, R42, R47, variable resistor VR2, diode D32, and transistor Q33, to set a second charging voltage fit for the voltage type of the battery loaded in the pocket 'B' according to a charging voltage selection control signal generated by the microprocessor 46.

A first charging current control circuit 32 consists of resistors R34, R36, R37, R38, R88, R99, operational amplifier U23A, and transistors Q31, Q88, Q99, to regulate the DC current from the smoothing circuit 24, and to control the charging current according to first and second current control signals generated by the microprocessor 46 detecting the voltage type of the battery. The microprocessor 46 recognizes the voltage types of the first and second batteries loaded in the respective pockets 'A' and 'B' by detecting the different resistance values of both batteries across resistors R62 and R63 respectively connected between the source voltage VCC and the C/F terminals of both batteries, to generate the first and second charging voltage selection control signals according to the voltage types of the batteries, and the switching control signals for supplying the charging voltages to the pockets 'A' and 'B'. It also generates first, second, third, and fourth current control signals according to the current capacities of the batteries, charging on/off control signal by detecting the value of the voltage corresponding to the current detected from the first charging current control circuit 32, and display control signal to indicate the charged state of the first and second batteries.

A charging current/voltage control circuit 34 consists of resistors R32, R40, R69, R70, operational amplifiers U24A, U24B, transistor Q37, capacitors C39, C44, C45, C46, C47, and photo-coupler PC1, to compare the charging voltage set by the second charging voltage selection circuit 38 with a prescribed reference voltage to generate a switching control signal for regulating the charging voltage corresponding to the voltage type of the battery, and a switching control signal for controlling the power switch 16 according to the charging current detected from the first charging current control circuit 32. A charging voltage control circuit 30 consists of a resistor R25, operational amplifier U26A, diode D24, and capacitor C24, to compare the charging voltage selected by the first charging voltage selection circuit 36 with a prescribed reference voltage so as to regulate the charging voltage supplied to the battery.

A second charging current control circuit 28 consists of resistors R20, R21, R22, R23, R24, R80, capacitor C23, operational amplifier U23B, and transistor Q21 to regulate the DC current from the chopper circuit 26, and to control the charging current according to the fourth current control signal generated by the microprocessor 46 detecting the current capacity of the battery.

First and second LED devices 48 and 50 each consist of a pair of green LED for signaling the battery fully charged and red LED for the battery not fully charged. In addition, simultaneously charging both batteries of the pockets 'A' and 'B', both red and green LEDs are turned on to indicate that the second charging voltage is lower than the first charging voltage. A first regulator 44 adjusts the rectified voltage of the first rectifying circuit 22 to a predetermined level to generate a source voltage Vcc supplied to the charging apparatus.

Such a conventional battery charger requires multiple current sources, and thus, separate chopper circuits and voltage and current control circuits for controlling the current sources, so that its circuit is complicated to increase the size together with the cost.

SUMMARY OF THE INVENTION

It is an object of the present invention to provide a battery charger for simultaneously charging multiple storage batteries, which employs a single source voltage to alternately charge the multiple storage batteries at different time intervals alternately predetermined according to their current capacities, thus reducing the size and cost of the battery charger.

According to an aspect of the present invention, a battery charger for charging at least two storage batteries, comprises: a first charging pocket for receiving a first storage battery; a second charging pocket for receiving a second storage battery; a main controller for generating a power supply control signal, a charging voltage setting control signal according to the voltage types of the batteries inserted in the first and second charging pockets, and a charging current setting control signal according to the current capacities of the batteries; a voltage adjustment circuit for adjusting the charging voltage to the levels respectively fit for the voltage types of the batteries according to the charging voltage setting control signal; a current adjustment circuit for adjusting the charging current to the levels respectively fit for the current capacities of the batteries according to the charging current setting control signal; and a power supply control circuit for supplying or blocking the charging voltages to the batteries according to the power supply control signal.

The present invention will now be described more specifically with reference to the drawings attached only by way of example.

DETAILED DESCRIPTION OF THE PREFERRED EMBODIMENT

Figure 2A:
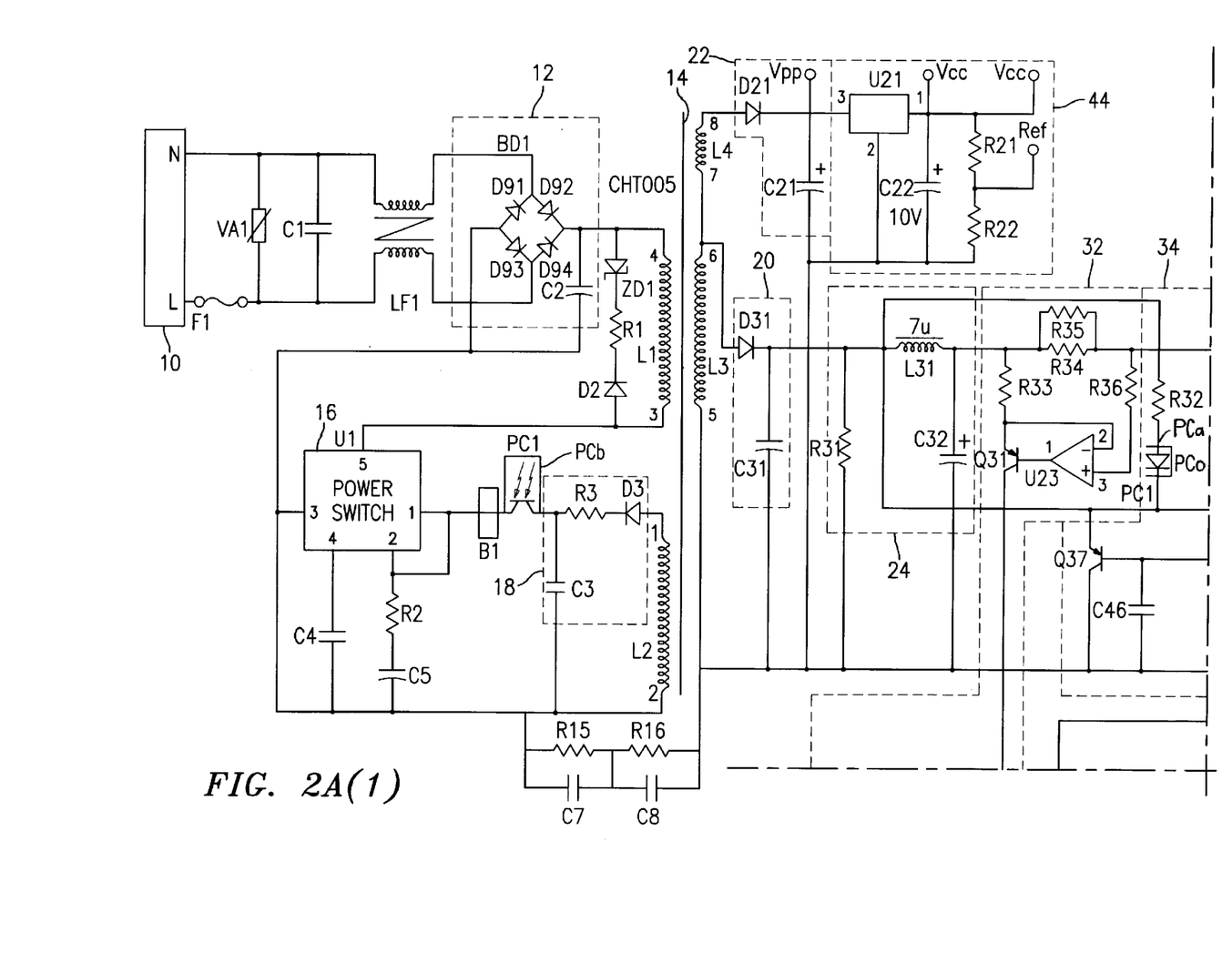
FIGS. 2A and 2B are a circuit diagram for illustrating the structure of a battery charger according to an embodiment of the present invention.
Figure 2B:
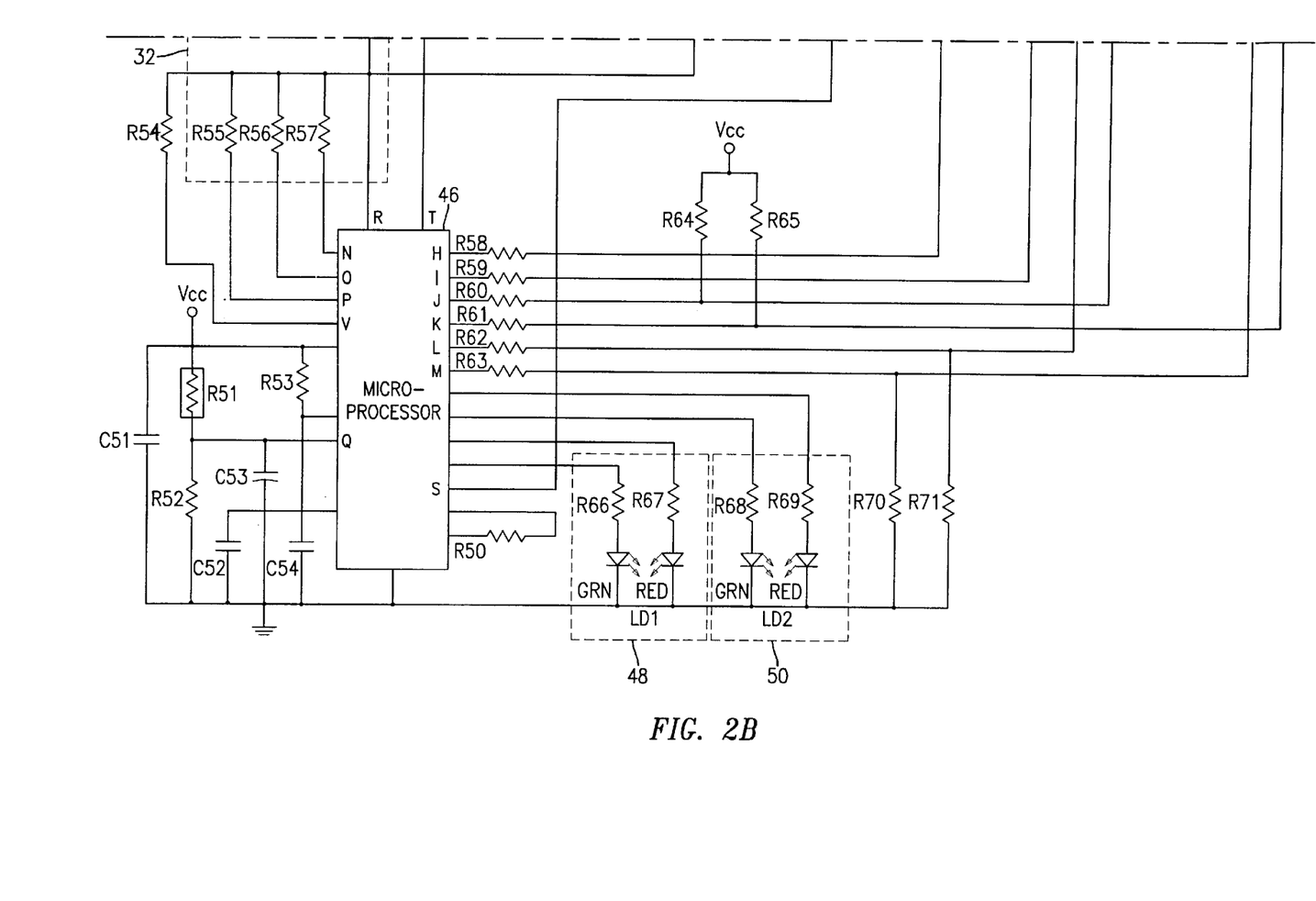

Referring now to the drawings, in which like reference numerals describe similar or identical elements, and with particular reference to FIGS. 2A and 2B, the circuit of the present invention includes an input terminal 10 for connecting with a power source of AC 110V to 220V, and a full-wave rectifier 12 consisting of bridge diodes D91–D94 and a capacitor C2 for full-wave rectifying the AC power from the input terminal 10 are used to produce a smoothed DC voltage. A Zener diode ZD1, resistor R1 and diode D2 serve to block a higher voltage exceeding a prescribed voltage. The DC voltage form the full-wave rectifier 12 causes a primary coil L1 of a transformer 14 to induce a secondary voltage in the secondary coils L2, L3 and L4. A power switch 16 is switched on/off to control the level of the secondary voltage induced in secondary coils L2, L3 and L4 according to a switching control signal.

The secondary voltage induced in the secondary coil L2 is rectified by a first rectifying circuit 18 consisting of a resistor R3, diode D3 and capacitor C3 to stabilize the DC voltage supplied to the power switch 16. The secondary voltage induced in the secondary coil L3 is rectified by a second rectifying circuit 20 consisting of a diode D31 and capacitor C31. The rectified voltage from the second rectifying circuit 20 is smoothed by a smoothing circuit 24 consisting of a choke coil L31, capacitor C32 and resistor R31, charging the storage batteries. The secondary voltage induced in the secondary coil L4 is rectified by a third rectifying circuit 22 consisting of a diode D21 and capacitor C21, supplied to a DC/DC converter 44.

A first charging voltage supply control circuit 40 comprises an FET Q23 to supply or block the charging voltage to a first battery loaded in pocket 'B' in response to a charging on/off control signal generated by the a microprocessor 46. As an example the Samsung Electronics Co. KS 86P40045 microprocessor can be used. A second charging voltage supply control circuit 42 comprises an FET Q24 to supply or block the charging voltage to a second battery loaded in pocket 'A' in response to a charging on/off control signal generated by the microprocessor 46. A charging voltage selection circuit 36 consists of resistors R40, R41, R42, R43, variable resistor VR1, and diode D32, to set the first charging voltage in response to a charging voltage selection signal generated by the microprocessor 46 detecting the voltage type of the battery loaded in the pocket 'A'. A charging current control circuit 32 consists of resistors R33, R34, R35, R36, R54, R55, R56, R57, operational amplifier U23, and transistor Q31, to regulate the DC current from the smoothing circuit 24, and to control the charging current according to first, second, and third current control signal generated by the microprocessor 46 detecting the current capacities of the batteries.

The microprocessor 46 detects the voltage types of the first and second batteries loaded in the first and second pockets 'A' and 'B' based on the values of their internal resistances detected across resistors R64 and R65 respectively connected with the C/F terminals of the batteries in order to generate first and second charging voltage selection control signals according to the detected voltage types of the batteries. The microprocessor 46 also generates a switching control signal to supply the charging voltages to the pockets 'A' and 'B', and first, second, and third current control signals according to the detected current capacities of the batteries, a charging on/off control signal based on the detection of the charged states of the batteries according to the value of the current detected from the charging current control circuit 32, and a display control signal to indicate the charged states of the first and second batteries. The charging current and voltage control circuit 34 consists of resistors R32, R37, R38, R39, operational amplifiers U32A, U32B, transistor Q37, capacitors C39, C44, C45, C46, C47, and photo-coupler PC1, to compare the charging voltage set by the charging voltage selection circuit 36 with a prescribed reference voltage so as to generate a switching control signal for supplying the charging voltage fit for the voltage type of the battery, and a switching control signal according to the amount of the charging current detected from the charging current control circuit 32 to control the power switch 16.

First and second LED devices 48 and 50 each consist of a pair of red and green LEDs to indicate the charged states of the batteries under the control of the microprocessor 46. The green LED indicates the fully charged state, and the red LED indicates the state under charging. When simultaneously charging both batteries of the pockets 'A' and 'B', both red and green LEDs are all turned on to indicate the state of the second battery being charged by yellow, thus representing that the second charging voltage is lower than the first charging voltage. The DC/DC converter 44 adjusts the rectified voltage from the third rectifying circuit 22 to a predetermined level supplied as a source voltage Vcc for the charger.

Figure 3:
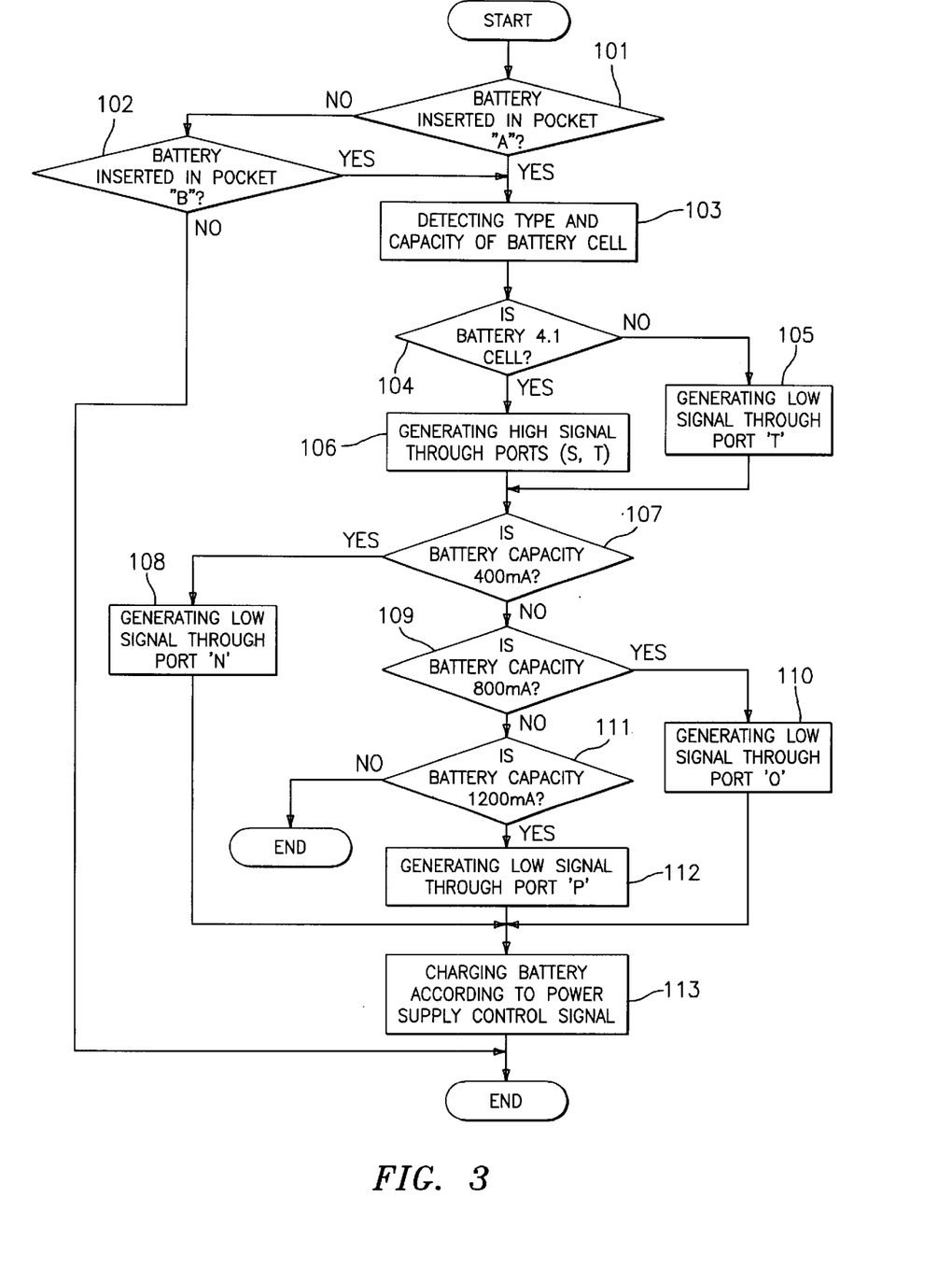
FIG. 3 is a flow chart for illustrating the process of charging a single storage battery loaded in one of the pockets provided in the inventive battery charger.

Describing the process for charging a single battery inserted in one of the pockets of the charger in connection with FIG. 3, the microprocessor 46 proceeds to step 103 upon detecting a storage battery inserted in the pocket 'A' in step 101. In step 103, it detects the voltage type and current capacity of the battery cell inserted in the pocket 'A' based on the voltage levels inputted through ports 'J' and 'L'. As an example, the voltage type is detected to be 4.1V or 4.2V through the port 'J', and, also as an example, the current capacity to be small (400 mA), medium (800 mA), or large (1200 mA) through the port 'L'. The voltage type of the battery inserted in the pocket 'A' is detected based on the divided voltage between the resistor R64 and the resistance R90 provided in the battery applied through the port 'J' of the microprocessor 46.

If the battery inserted in the pocket 'A' is detected not as 4.1V but as 4.2V in step 104, the microprocessor 46 proceeds to step 105 to generate through port 'T' logically low signal for the charging voltage selection signal of the battery of the pocket 'A', so that the divided voltage produced by the resistors R40 and R41 and variable resistor VR1 of the charging voltage setting circuit 36 is applied to the inverting input (−) of the comparator U32A, used as the voltage for setting the charging voltage fit for the voltage type of the storage battery of the pocket 'A'. Then, the comparator U32A compares the set voltage with a prescribed reference voltage applied to the non-inverting input (+), in order to generate logically low or high signal according as the set voltage is higher or lower than the reference voltage. If the output signal of the comparator U32A is low, the transistor Q37 is turned on so as to cause the light emitting diode PCa of the photo-coupler PC1 to generate a light ray received by the light-sensitive transistor PCb, which is turned on to control the power switch 16. On the contrary, if the output signal of the comparator U32A is high, the transistor Q37 is turned off, and so the light emitting diode PCa, so that the light-sensitive transistor PCb is also turned off. This operation of turning on and off is rapidly repeated to maintain the charging voltage as 4.2V.

On the other hand, if the microprocessor 46 generates high signal through ports 'S' and 'T' in step 106, the divided voltage produced by the resistors R40 and R41 and variable resistor VR1 is applied to the inverting input of the comparator U32A used as the voltage for setting the charging voltage of the battery of the pocket 'A' to 4.1V. Then, the comparator U32A compares the set voltage with the reference voltage applied to the non-inverting input (+), in order to generate logically low or high signal according as the set voltage is higher or lower than the reference voltage. If the output signal of the comparator U32A is low, the transistor Q37 is turned on so as to cause the light emitting diode PCa of the photo-coupler PC1 to generate a light ray received by the light-sensitive transistor PCb, which is turned on to control the power switch 16. On the contrary, if the output signal of the comparator U32A is high, the transistor Q37 is turned off, and so the light emitting diode PCa, so that the light-sensitive transistor PCb is also turned off This operation of turning on and off is rapidly repeated to maintain the charging voltage as 4.1V.

Thereafter, if the microprocessor 46 detects the current capacity of the battery of the pocket 'A' to be small (400 mA) in step 107, it proceeds to step 108 to generate through port 'N' low signal supplied through the resistor R57 to the inverting input (−) of the comparator U32B. The comparator U32B generate low or high signal in step 108 according as the voltage applied to the inverting input (−) is higher or lower than the reference voltage applied to the non-inverting input (+). If the output signal of the comparator U32B is low, the transistor Q37 is turned on so as to cause the light emitting diode PCa of the photo-coupler PC1 to generate a light ray received by the light-sensitive transistor PCb, which is turned on to control the power switch 16. On the contrary, if the output signal of the comparator U32B is high, the transistor Q37 is turned off, and so the light emitting diode PCa, so that the light-sensitive transistor PCb is also turned off. This operation of turning on and off is rapidly repeated to control the charging voltage. When the smoothing circuit 24 supplies the charging voltage, the current flowing through the resistors R34 and R35 is amplified through the operational amplifier U23, supplied to the base of the transistor Q31, whose output is linearly varied according to the output of the operational amplifier U23 to result in linear variation of the voltage applied to the port 'R' of the microprocessor 46. Thus, the microprocessor 46 may convert the voltage variation into the value of the current flowing through the resistors R35 and R34. Subsequently, the microprocessor 46 supplies the first charging voltage supply control signal through the port 'I' to the gate of the FET Q24 to charge the battery of the pocket 'A'.

However, if the current capacity of the battery is not detected small in step 107, the microprocessor 46 proceeds to step 109 to detect it to be medium (800 mA). Then, in step 110, the microprocessor 46 generates a low signal through the port 'O' to the resistor R56. In step 113, the microprocessor 46 supplies the first charging voltage supply control signal through the port 'I' to the gate of the FET Q24 to charge the battery of the pocket 'A'. On the other hand, if the current capacity of the battery is not detected medium in step 109, the microprocessor 46 proceeds to step 111 to detect it to be large (1200 mA). Then, in step 112, the microprocessor 46 generates a low signal through the port 'P' to the resistor R55. In step 113, the microprocessor 46 supplies the first charging voltage supply control signal through the port 'I' to the gate of the FET Q24 to charge the battery of the pocket 'A'. Meanwhile, the microprocessor 46 checks the charging state of the battery of the pocket 'A' through the port 'S'. For example, it periodically detects whether the current flowing from the battery is 120 mA, 90 mA or 70 mA respectively for the large, medium or small current capacity. Detecting the same value 19 times and the fully charged voltage of 3.9V maintained for a predetermined time, the battery inserted in the pocket 'A' is determined to be in the fully charged state. The battery being fully charged, the microprocessor 46 applies the first charging voltage cut-off signal to the gate of the FET Q24 to stop the charging. However, reverting to step 101, if the battery is not inserted in the pocket 'A', it proceeds to step 102 to check the battery to be inserted in the pocket 'B'. The battery being inserted in the pocket 'B', the steps of 103 to 113 are likewise performed to charge the battery.

Figure 4A:
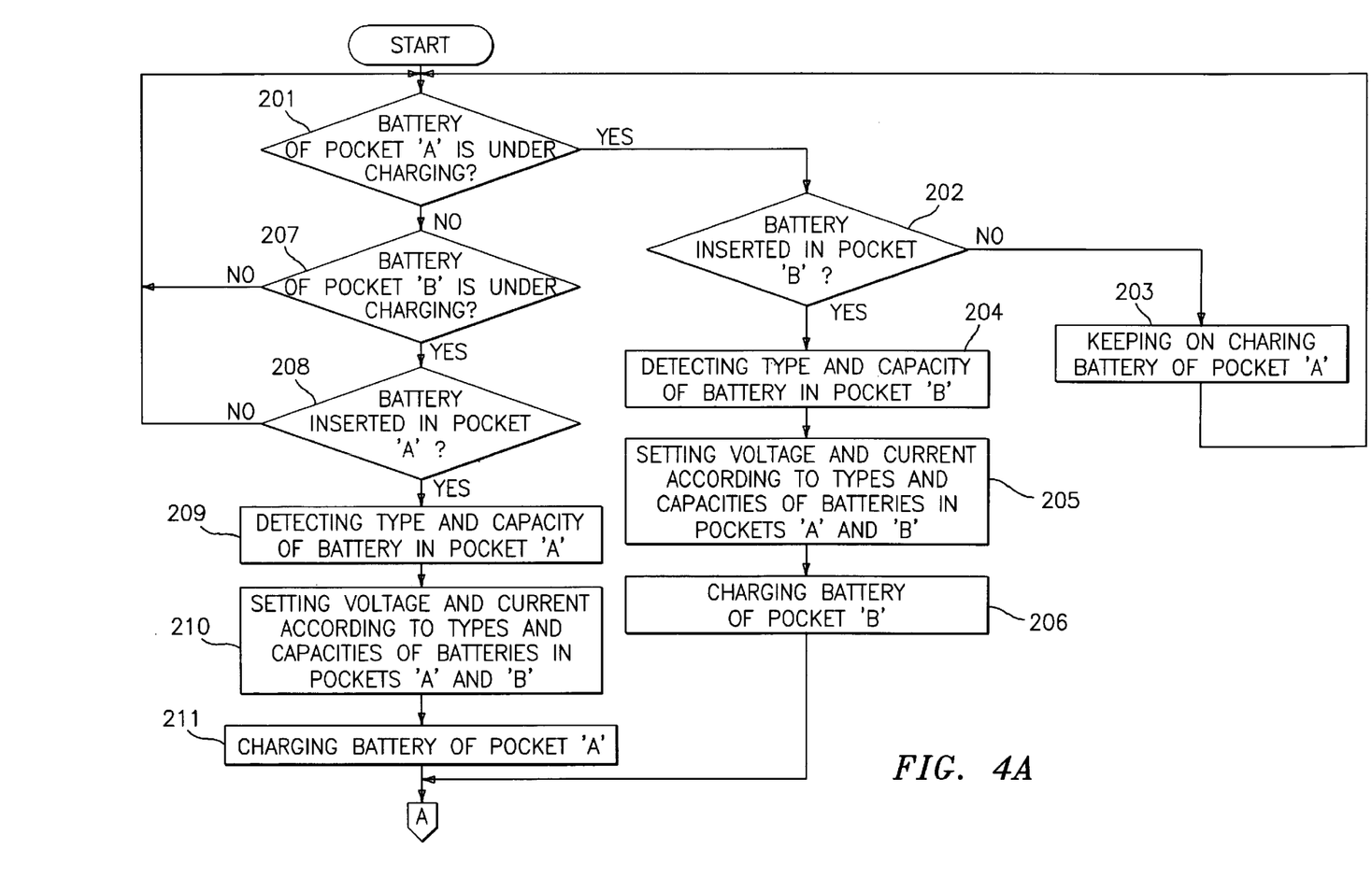
FIGS. 4A and 4B are a flow chart for illustrating the process of charging multiple storage batteries loaded in the multiple pockets provided in the inventive battery charger.
Figure 4B:
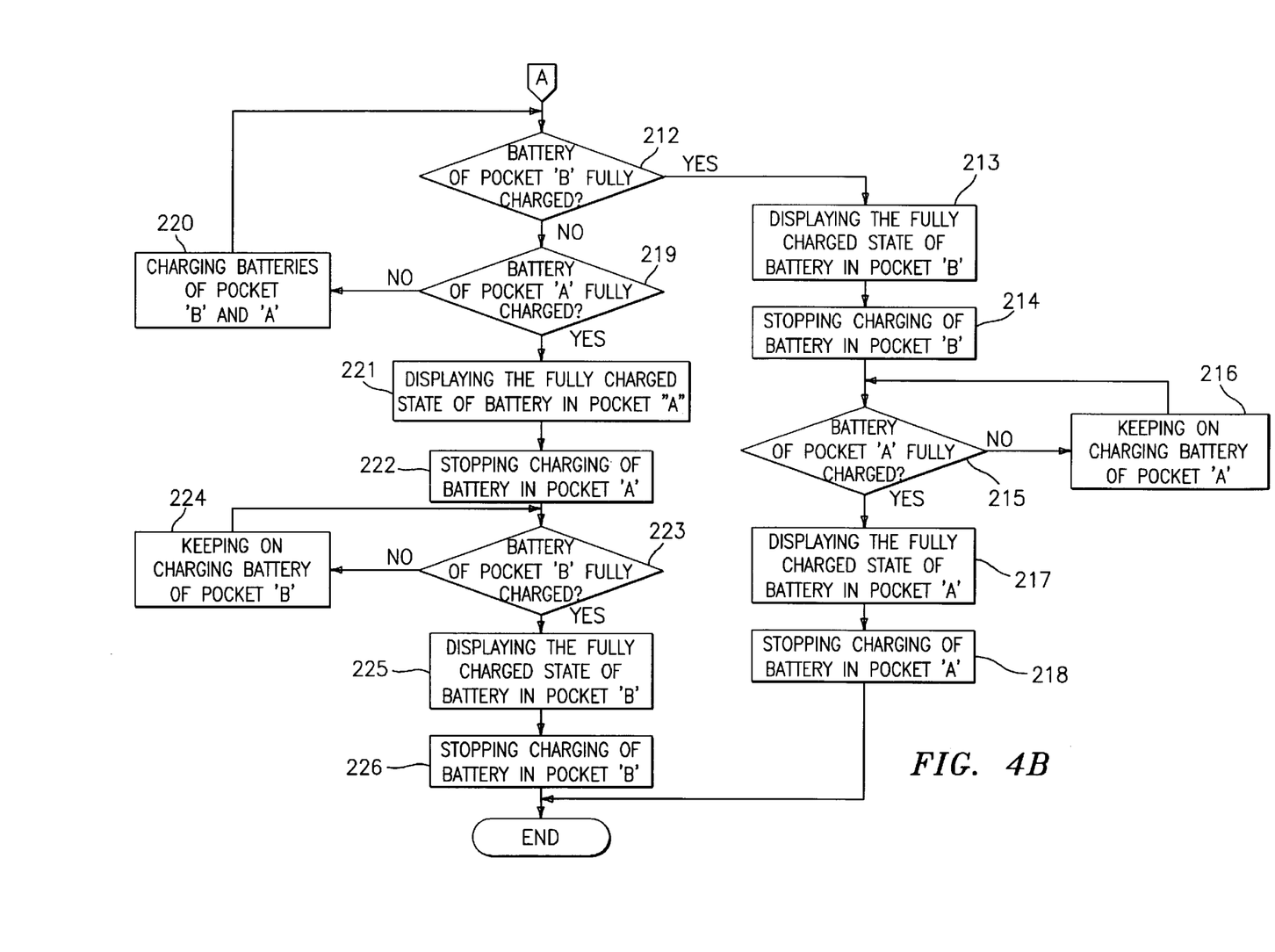

Describing the process for charging the batteries simultaneously inserted in the two pockets in connection with FIG. 4, if a battery is inserted in the pocket 'A' and under charging in step 201, as described with reference to FIG. 3, the microprocessor 46 proceeds to step 202 to check the pocket 'B' to have a battery. Not detecting the battery in the pocket 'B', the step 203 is carried out to keep on charging of the battery in the pocket 'A'. On the contrary, a battery being inserted in the pocket 'B' in step 202, the step 204 is performed to detect the voltage type and current capacity of the battery of the pocket 'B'. In this case, the microprocessor 46 detects the current capacity through the port 'M' and the voltage type through the port 'K'. Then, in step 205, the microprocessor 46 makes the voltage and current setting according to the voltage type and current capacities of the batteries in both pockets 'A' and 'B', as shown in the following Table 1.

charged. Not detecting the fully charged state of the battery of pocket 'A', step 220 is performed to keep on charging the batteries of pockets 'A' and 'B'. On the contrary, if the battery of pocket 'A' is fully charged, the microprocessor 46 proceeds to step 221 to control the first LED device 48 to turn on the green LED indicating the fully charged state. Then, the microprocessor 46 generates in step 222 a low signal through the port 'I' to turn off the FET Q24 to stop the charging. Subsequently, the microprocessor detects in step 223 through the ports 'M' and 'K' whether the battery of pocket 'B' is fully charged. Not detecting the fully charged

TABLE 1

| | | Voltage Setting | | | Current Selection |
|---|---|---|---|---|---|
| Pocket A | Pocket B | Voltage Selection Signal | Pocket A | Pocket B | Current Selection Signal |
| 4.1 V | 4.1 V | High Signal through Ports 'S' & 'T' | Small | Small | High Signal through Port 'N' |
| 4.2 V | 4.1 V | Low Signal through Port 'S' | Small | Medium | High Signal through Port 'O' |
| 4.1 V | 4.2 V | Low Signal through Port 'S' | Medium | Large | High Signal through Port 'P' |
| 4.2 V | 4.2 V | Low Signal through Port 'T' | Large | Large | High Signal through Port 'V' |

In step 206, the microprocessor 46 generates high signal through the ports 'H' and 'I' to turn on the FETs Q23 and Q24 to charge the batteries of the pockets 'A' and 'B'. The values of the resistors R54, R55, R56, and R57 should be determined according to the current capacities of the batteries.

However, if the battery of the pocket 'A' is not under charging in step 201, the battery of the pocket 'B' is checked to be under charging in step 207. If the battery of the pocket 'B' is under charging, the step 208 is performed to check a battery inserted in the pocket 'A'. The process goes to step 209 or step 201 depending on whether a battery is inserted in pocket 'A' or not. In step 209, the microprocessor detects the current capacity of the battery in the pocket 'A' through the port 'L', and its voltage type through the port 'J'. In step 210, the microprocessor 46 sets the voltages and currents according to the voltage types and current capacities of the batteries of the pockets 'A' and 'B', as shown in Table 1, and proceeds to step 211 to generate a high signal through ports 'H' and 'I' to turn on the FETs Q23 and Q24 to charge the batteries of the pockets 'A' and 'B'.

Meanwhile, if the microprocessor 46 detects the fully charged state of the battery of pocket 'B' in step 212, it proceed to step 213 to control the second LED device 50 to turn on the green LED indicating the fully charged state. Then, the microprocessor 46 generates a low signal through the port 'H' to turn off the FET Q23 to stop the charging. In addition, the microprocessor 46 detects in step 215 through the ports 'J' and 'L' whether the battery of pocket 'A' is fully charged. If the battery of pocket 'A' is not fully charged, it proceeds to step 216 to keep on charging the battery. However, detecting the fully charged state of the battery in pocket 'A', the microprocessor 46 proceeds to step 217 to control the first LED device 48 to turn on the green LED indicating the fully charged state. Then, the microprocessor 46 generates in step 218 a low signal through the port 'I' to turn off the FET Q24 to stop the charging.

However, if the battery of pocket 'B' is not fully charged in step 212, the microprocessor detects in step 219 through the ports 'J' and 'L' whether the battery of pocket 'A' is fully state of the battery of pocket 'B', step 224 is performed to keep on charging the battery of pocket 'B'. On the contrary, if the battery of pocket 'B' is fully charged, the microprocessor 46 proceeds to step 225 to control the second LED device 50 to turn on the green LED indicating the fully charged state. Then, the microprocessor 46 generates in step 226 a low signal through the port 'H' to turn off the FET Q23 to stop the charging.

Figure 5A:
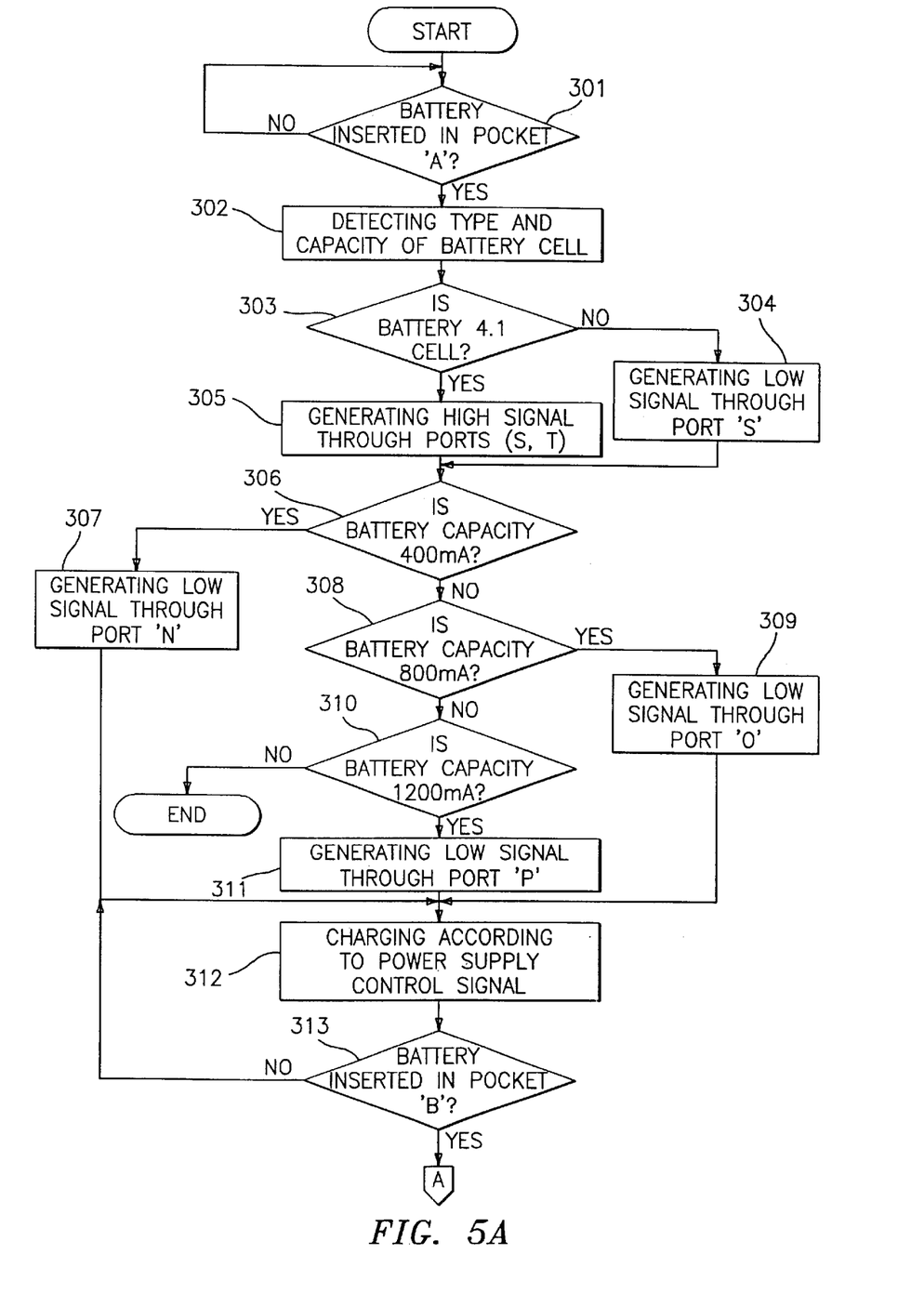
FIGS. 5A and 5B show a flow chart for illustrating the process of charging multiple storage batteries loaded in the multiple pockets provided in the inventive battery charger according to another embodiment.
Figure 5B:
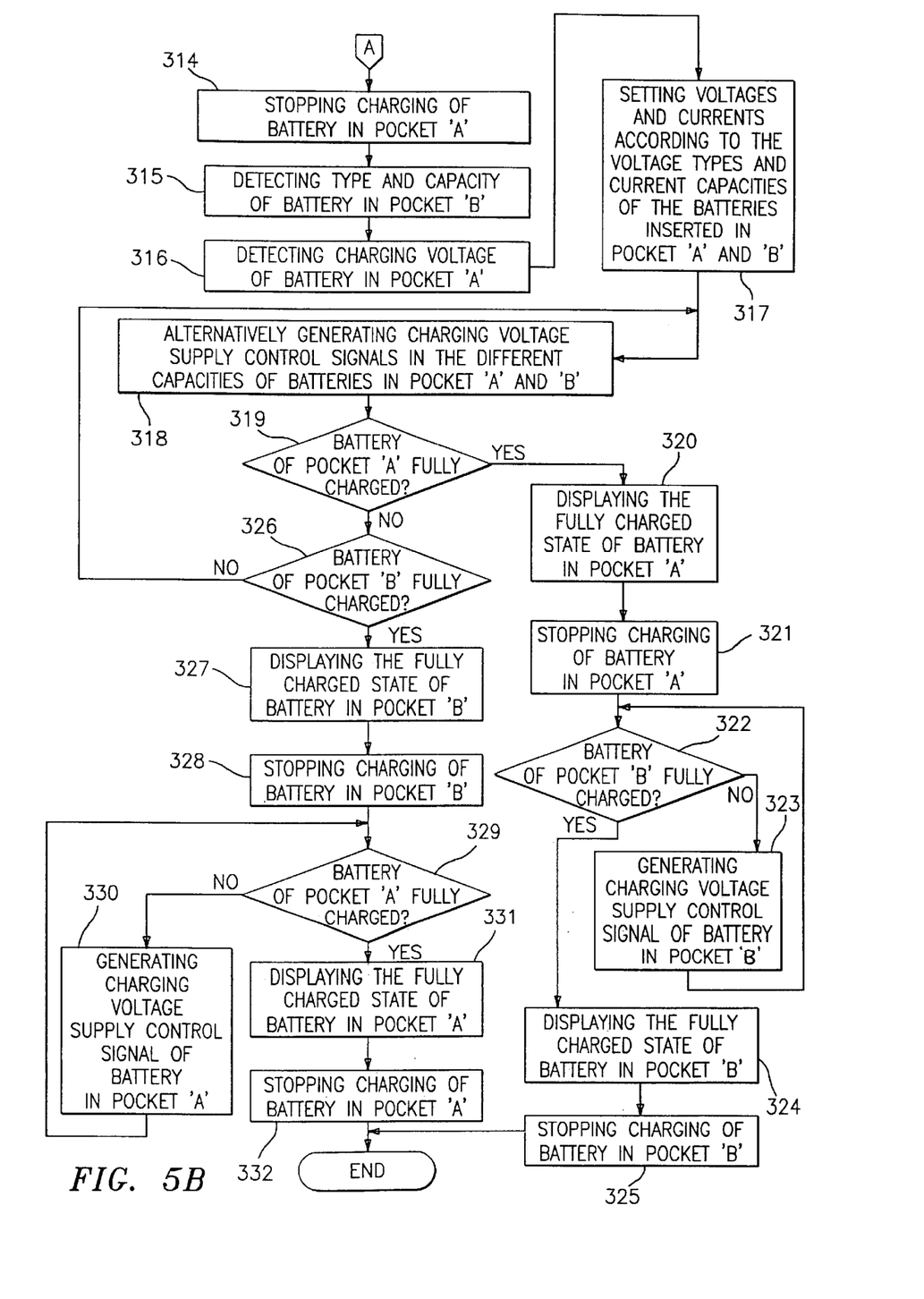
Figure 6:
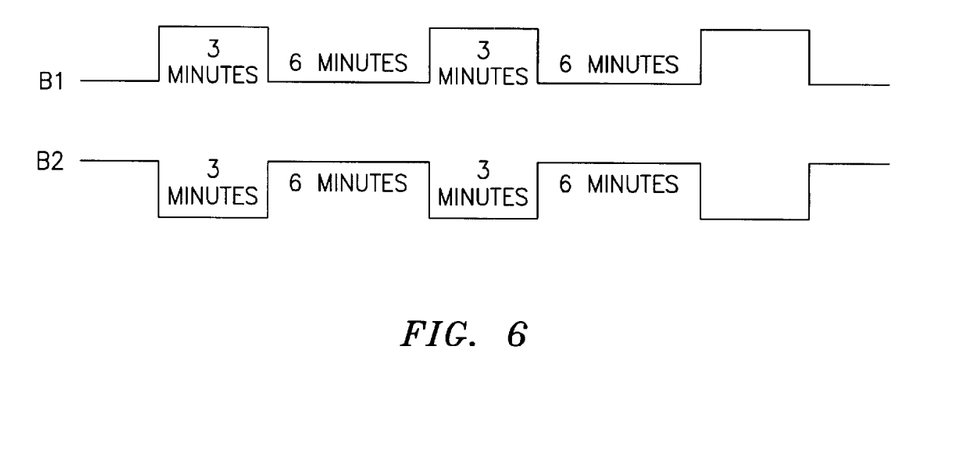
FIG. 6 illustrates the timing pulses for alternately charging the multiple batteries according to another embodiment of the present invention.

Describing another embodiment of the inventive process for charging the multiple batteries inserted in the multiple pockets of the charger in connection with FIGS. 5A, 5B and 6, the microprocessor 46 checks to see if it detects a battery inserted in pocket 'A' in step 301. If no battery is detected in pocket 'A' the process proceeds to step 301a to check pocket 'B'. This process continues until a battery is detected in one of the pockets. If a battery is detected in pocket 'B' then the process proceeds as depicted in FIGS. 5A and 5B with the labels 'A' and 'B' substituted for each other. If a battery is detected in pocket 'A' the process proceeds to step 302 to detect the voltage type and current capacity of the battery of pocket 'A' based on the voltage level inputted through the ports 'J' and 'L'. Namely, through the port 'J' is detected whether the voltage type is 4.1V or 4.2V, and through the port 'L' whether the current capacity is small (400 mA), medium (800 mA), or large (1200 mA). The voltage type of the battery inserted in pocket 'A' is detected based on the divided voltage between the resistor R64 and the resistance R90 provided in the battery applied through the port 'J' of the microprocessor 46.

If the battery inserted in pocket 'A' is detected not as 4.1V but as 4.2V, the microprocessor 46 proceeds to step 304 to generate through port 'T' low signal for the charging voltage selection signal of the battery of pocket 'A', so that the divided voltage produced by the resistors R40 and R41 and variable resistor VR1 of the charging voltage setting circuit 36 is applied to the inverting input of the comparator U32A, used as the voltage for setting the charging voltage fit for the voltage type of the storage battery of the pocket 'A'. Then, the comparator U32A compares the set voltage with a prescribed reference voltage applied to the non-inverting input (+), in order to generate a logically low or high signal depending on whether the set voltage is higher or lower than the reference voltage. If the output signal of the comparator U32A is low, the transistor Q37 is turned on so as to cause the light emitting diode PCa of the photo-coupler PC1 to generate a light ray received by the light-sensitive transistor PCb, which is turned on to control the power switch 16. On the contrary, if the output signal of the comparator U32A is high, the transistor Q37 is turned off, and so the light emitting diode PCa, so that the light-sensitive transistor PCb is also turned off, This operation of turning on and off is rapidly repeated to maintain the charging voltage as 4.2V.

On the other hand, if the microprocessor 46 generates a high signal through ports 'S' and 'T' for the voltage type of 4.1V in step 305, the divided voltage produced by the registers R40 and R41 and variable resistor VR1 is applied to the inverting input of the comparator U32A used as the voltage for setting the charging voltage of the battery of pocket 'A' to 4.1V. Then, the comparator U32A compares the set voltage with the reference voltage applied to the non-inverting input (+), in order to generate a logically low or high signal depending on whether the set voltage is higher or lower than the reference voltage. If the output signal of the comparator U32A is low, the transistor Q37 is turned on so as to cause the light emitting diode PCa of the photo-coupler PC1 to generate a light ray received by the light-sensitive transistor PCb, which is turned on to control the power switch 16. On the contrary, if the output signal of the comparator U32A is high, the transistor Q37 is turned off, and so the light emitting diode PCa, so that the light-sensitive transistor PCb is also turned off. This operation of turning on and off is rapidly repeated to maintain the charging voltage as 4.1V.

Thereafter, if the microprocessor 46 detects the current capacity of the battery of pocket 'A' to be small (400 mA) in step 306, it proceeds to step 307 to generate through port 'N' a low signal supplied through the resistor R57. In this case, When the smoothing circuit 24 supplies the charging voltage, the current flowing through the resistors R34 and R35 is amplified through the operational amplifier U23, supplied to the base of the transistor Q31, whose output is linearly varied according to the output of the operational amplifier U23 to result in linear variation of the voltage applied to the port 'R' of the microprocessor 46. Thus, the microprocessor 46 may convert the voltage variation into the value of the current flowing through the resistors R35 and R34.

However, if the current capacity of the battery is not detected small in step 306, the microprocessor 46 proceeds to step 308 to detect it to be medium (800 mA). Detecting medium, the microprocessor 46 generates in step 309 a low signal through the port 'O' to the resistor R56. On the other hand, if not detecting medium in step 308, the microprocessor 46 proceeds to step 310 to check whether the current capacity of the battery is large (1200 mA). If so, the microprocessor 46 generates in step 311 a low signal through the port 'P' to the resistor R55. Thus, selecting the current and voltage fit for the current capacity and voltage type of the battery of pocket 'A', the microprocessor 46 supplies in step 311 the first charging voltage supply control signal through the port 'I' to the gate of the FET Q24 to charge the battery of pocket 'A'.

Meanwhile, the microprocessor 46 detects in step 313 whether a battery is inserted in pocket 'B'. If not detecting the battery, it returns to step 312. But, if detecting it, it proceeds to step 314 to generate through port 'I' a low signal applied to the gate of the FET 24, which then is turned off to stop the charging of the battery in pocket 'A'. In step 315, the microprocessor 46 detects the voltage type and current capacity of the battery in pocket 'B' based on the voltage levels input through the ports 'K' and 'M'. Namely, through the port 'K' is detected the voltage type, 4.1V or 4.2V, and through the port 'M' the current capacity, 400 mA, 800 mA or 1200 mA. In step 316, the microprocessor 46 detects the charging state of the battery in pocket 'A' based on the voltage level input through the port 'L', proceeding to step 317 to set the voltages and currents according to the voltage types and current capacities of the batteries inserted in pockets 'A' and 'B', as described in Table 1.

In step 318, the microprocessor 46 alternately provide the gates of the FETs Q23 and Q24 with charging voltage supplying control signals according to the voltage types and current capacities of the batteries in pockets 'A' and 'B'. Of course, the time intervals for alternately charging the batteries in pockets 'A' and 'B' are determined according to the voltage types and current capacities. For example, setting the time difference as 1 minute for the charging voltage difference of 0.1V and as 1 minute for the current capacity difference between the two batteries, the microprocessor 46 applies a control signal as shown by B1 of FIG. 6 to the FET Q24, and a control signal as shown by B2 of FIG. 6 to the FET Q23, respectively for the battery with the charging voltage of 2.8V and the small current capacity in the pocket 'A' and the battery with the charging voltage of 3.0V and the medium current capacity in the pocket 'B'. Thus, the batteries in the pockets 'A' and 'B' are alternately charged respectively for 3 minutes and 6 minutes until fully charged.

Thereafter, detecting the fully charged state of the battery in pocket 'A', the microprocessor 46 proceeds to step 320 to turn on the green LED of the first LED device 48 indicating the fully charged state as well as to generate low signal through the port 'I' to turn off the FET Q24 stopping the charging. Meanwhile, the microprocessor 46 checks the charged state of the battery in pocket 'B' through the ports 'K' and 'M' in step 322. If not detecting the fully charged state, it supplies in step 323 the charging voltage supplying control signal to the gate of the FET Q23 to keep on charging of the battery in pocket 'B'. However, detecting the fully charged state, it proceeds to step 324 to turn on the green LED of the second LED device 50 indicating the fully charged state of the battery in pocket 'B' as well as to generate a low signal through the port 'H' to turn off the FET Q23 stopping the charging of the battery in pocket 'B'.

However, reverting to step 319, if the battery in pocket 'A' is not fully charged, the microprocessor 46 proceeds to step 326 to detect through the ports 'M' and 'K' whether the battery of the pocket 'B' is fully charged. If not detecting the fully charged state of the battery of pocket 'B', the process returns to step 318. Or otherwise, it proceeds to step 327 to turn on the green LED of the second LED device 50 indicating the full charged state of the battery of pocket 'B', and generates a low signal through the port 'H' to turn off the FET Q23, proceeding to step 329 to detect through the ports 'L' and 'J' whether the battery of the pocket 'A' is fully charged. If not detecting the fully charged state of the battery in the pocket 'A', it proceeds to step 330 to keep on charging it. However, detecting the fully charged state, it proceeds to step 331 to turn on the green LED of the first LED device 48 indicating the fully charged state of the battery in pocket 'A', and generates in step 332 a low signal through the port 'I' to turn off the FET Q24 stopping the charging. Of course, the method of detecting the fully charged state is achieved as shown in FIG. 3.

Thus, the multiple batteries inserted in the multiple pockets of the battery charger may be charged simultaneously by using a single voltage source, thereby reducing its size and cost.

While the present invention has been described in connection with specific embodiments accompanied by the attached drawings, it will be readily apparent to those skilled in the art that various changes and modifications may be made thereto without departing the gist of the present invention.

What is claimed is:

1. A battery charger for charging at least two storage batteries, comprising:
    a first charging pocket for receiving a first storage battery;
    a second charging pocket for receiving a second storage battery;
    a main controller for generating a power supply control signal, a charging voltage setting control signal according to the voltage types of the batteries inserted in the first and second charging pockets, and a charging current setting control signal according to the current capacities of said batteries;
    a voltage adjustment circuit for adjusting a charging voltage to the levels fit for the voltage types of said batteries, respectively, according to said charging voltage setting control signal;
    a current adjustment circuit for adjusting a charging current to the levels fit for the current capacities of said batteries, respectively, according to said charging current setting control signal; and
    a power supply control circuit for supplying or blocking the charging voltages to said batteries according to said power supply control signal.

2. A battery charger as defined in claim 1, wherein said voltage adjustment circuit further includes a voltage setting part for setting the charging voltage according to the detected voltage types of said first and second batteries, and a charging voltage control circuit for comparing the set charging voltage with a predetermined reference voltage to generate a switching control signal to produce a uniform set charging voltage.

3. A battery charger as defined in claim 2, further including a charged voltage detector for generating a voltage to detect the amount of the voltages charged in said first and second batteries.

4. A battery charger for charging at least two storage batteries, comprising:
    an AC/DC converter for converting an AC voltage into a DC charging voltage;
    a first charging pocket for receiving a first storage battery;
    a second charging pocket for receiving a second storage battery;
    a first and second charging voltage supply control circuit for controlling said DC charging voltage to be supplied to or blocked from said first and second batteries;
    a charging voltage setting circuit for setting said charging voltage according to the voltage types of said first and second batteries respectively inserted in said first and second charging pockets;
    a charging current detector for detecting a charging current based on the detection of a DC current supplied from said AC/DC converter;
    a main controller for recognizing the voltage types and current capacities of said first and second batteries inserted in said first and second charging pockets by respectively detecting their internal resistance values and specified voltages to generate a charging voltage setting control signal and a charging current selection signal respectively according to said voltage types and current capacities, and for generating a charging on/off control signal according to the voltage detected from said charging current detector and a display control signal to indicate a charged state of said first and second batteries; and
    a charging voltage control circuit for comparing the set charging voltage of said charging voltage setting circuit with a prescribed reference voltage to generate a switching control signal to said AC/DC converter to regulate the level of said charging voltage.

5. A battery charger as defined in claim 4, further including a charging current selection circuit to control the charging current of said charging current detector according to said charging current selection signal.

6. A battery charger as defined in claim 5, further including a first and a second LED for indicating the charged state of said first and second batteries under the control of said main controller.

7. A battery charger as defined in claim 4, wherein said charging voltage control circuit includes a comparator for comparing the set charging voltage of said charging voltage setting circuit with a prescribed voltage to generate a logically low signal when said set charging voltage is greater than said reference voltage, a switching transistor turned on in response to the low signal from said comparator, and a photo-coupler for controlling said AC/DC converter to produce the set charging voltage by means of a light-sensitive output transistor driven by a light emitting diode controlled by said switching transistor.

8. A battery charger for charging at least two storage batteries, comprising:
    a first charging pocket for receiving a first storage battery;
    a second charging pocket for receiving a second storage battery;
    a main controller for generating a charging voltage setting control signal according to the voltage types of the batteries inserted in the first and second charging pockets, a charging current setting control signal according to the current capacities of said batteries, and a power supply control signal to alternately charge said batteries at different intervals according to said voltage types and current capacities;
    a charging voltage control circuit for adjusting a charging voltage to levels fit for the voltage types of said batteries, respectively, according to said charging voltage setting control signal;
    a current adjustment circuit for adjusting a charging current to levels fit for the current capacities of said batteries, respectively, according to said charging current setting control signal; and
    a power supply control circuit for alternately supplying or blocking the charging voltages to said batteries according to said power supply control signal.

9. A battery charger as defined in claim 8, further including a first and a second LED for indicating a charged state of said first and second batteries under the control of said main controller.

10. A battery charger as defined in claim 8, wherein said charging voltage control circuit includes a comparator for comparing the adjusted charging voltage with a prescribed voltage to generate a logically low signal when said set voltage is greater than said reference voltage, a switching transistor turned on in response to the low signal from said comparator, and a photo-coupler for controlling said AC/DC converter to produce the adjusted charging voltage by means of a light-sensitive output transistor driven by a light emitting diode controlled by said switching transistor.

11. A method for charging multiple storage batteries inserted in at least two pockets provided in a battery charger, comprising the steps of:

detecting voltage types and current capacities of said storage batteries; and     charging said storage batteries with a charging voltage and a charging current respectively according to said voltage types and current capacities.

12. A method as defined in claim 11, wherein the voltage types of batteries are one of 4.1V and 4.2V cell.

13. A method as defined in claim 12, wherein the current capacities of batteries are one of large, medium, and small.

14. A method as defined in claim 12, wherein said charging voltage is 4.1V when the voltage types of said batteries are all 4.1V cell.

15. A method as defined in claim 12, wherein said charging voltage is 4.2V when the voltage types of said batteries are all 4.2V cell.

16. A method as defined in claim 12, wherein said charging voltage is 4.15V when the voltage types of said batteries are respectively 4.1V and 4.2V cell.

17. A method as defined in claim 13, wherein said charging current is 2400 mA when said batteries all have large current capacities.

18. A method as defined in claim 13, wherein said charging current is 800 mA when said batteries all have small current capacities.

19. A method as defined in claim 13, wherein said charging current is 1600 mA when said batteries respectively have small and large current capacities.

20. A method as defined in claim 13, wherein said charging current is 1200 mA when said batteries respectively have small and medium current capacities.

21. A method for charging multiple storage batteries inserted in at least two pockets provided in a battery charger, comprising the steps of:

detecting voltage types and current capacities of said storage batteries; and     alternately charging said storage batteries with a charging voltage and a charging current fit for the voltage types and current capacities of said storage batteries, respectively, at different intervals set according to said voltage types and current capacities.

22. A method as defined in claim 21, including the further steps of adjusting the charging voltage to a level respectively fit for the voltage types of said batteries, and adjusting a charging current to a level respectively fit for the current capacities of said batteries.

\* \* \* \* \*